Figure 1:
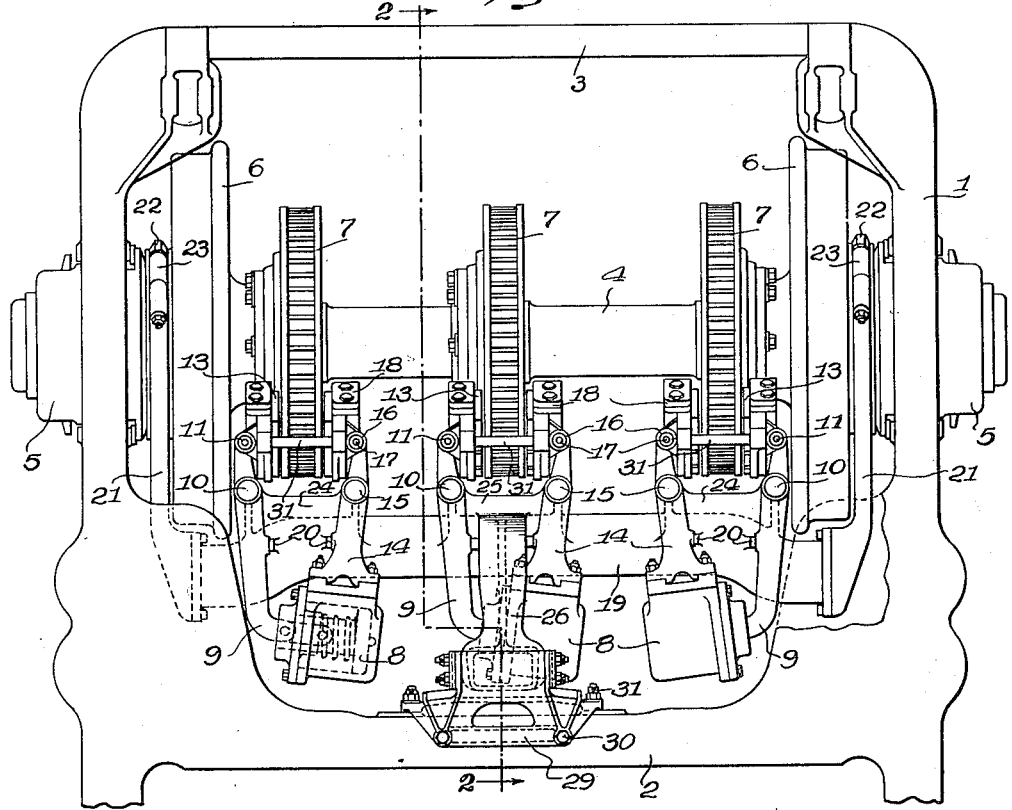

May 13, 1941.  C. L. EKSERGIAN  2,242,060

BRAKE MECHANISM

Filed Nov. 10, 1939

INVENTOR
*Carolus L. Eksergian*

BY *John P. Darby*
ATTORNEY

Patented May 13, 1941

2,242,060

UNITED STATES PATENT OFFICE 2,242,060

BRAKE MECHANISM

Carolus L. Eksergian, Detroit, Mich., assignor to Budd Wheel Company, Philadelphia, Pa., a corporation of Pennsylvania Application November 10, 1939, Serial No. 303,789

4 Claims. (Cl. 188—153)

The present invention relates to brakes.

More particularly it relates to brakes wherein a greater number of braking elements than heretofore customary is provided.

Although the invention is not restricted to brakes of the ring or disk type, it is particularly advantageous when applied to brakes of this kind.

Usually where disk brakes are used, two such disks are provided for each pair of wheels or each axle. The present invention contemplates increasing this number, and specifically discloses an embodiment wherein three brakes are mounted on one axle.

The invention further contemplates certain modifications of the cooperating structures of the wheel truck and of the brake yoke supporting arm, which facilitate accommodating the extra brake elements within the limited space available in the truck frame, so as to provide a very compact arrangement of the parts.

The invention further contemplates providing an extremely simple braking mechanism, which reduces the number of parts needed practically to a minimum, and eliminates any need for equalizing devices or other mechanical connections between the brake mechanisms, since each is complete in itself.

Further objects and advantages of the invention will in part specifically be pointed out in the present specification and the accompanying drawing, and in part will be self-evident from the disclosure.

Figure 2:
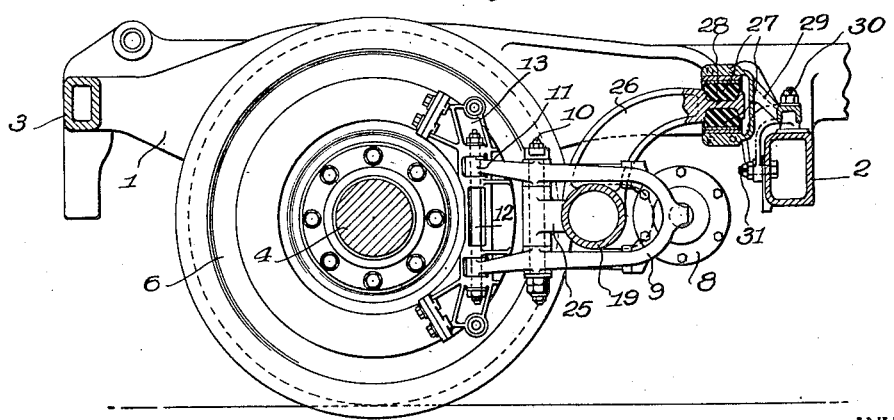

In the drawing:

Fig. 1 is a diagrammatic plan view, partly broken away, of a truck frame having a triple brake mechanism mounted thereon; and Fig. 2 is a fragmentary sectional view through the structure represented in Fig. 1, the section being made on the planes represented by the broken line 2—2 of Fig. 1, certain parts being shown in elevation.

In all the figures, similar elements are designated by the same reference characters.

Reference character 1 designates the frame, which has the transverse members 2 and 3, that define the space available for the wheels and for the brake mechanism. The axle 4 is mounted in the axle boxes 5 movably mounted in the usual pedestals and carries the wheels 6.

Upon the axle 4 is mounted the desired number of brake disks 7, three such disks being disclosed in the present case. Each disk 7 has its own brake cylinder 8 coacting therewith, and it will be seen that these brake mechanisms are identical in all respects, the one shown at the right merely being turned upside down with respect to the other two. This simplifies the construction since all the parts are thus standardized.

While any desired style of brake shoe actuating mechanism may be embodied in the structure, and it is not intended to restrict the invention to the particular means illustrated, nevertheless this form is preferred because of its relative simplicity. Each cylinder 8 has the usual piston therein, as shown in dotted lines in the left-hand cylinder of Figure 1, and this piston bears against the inner end of the bifurcated or U-shaped lever 9 which is pivoted at 10, and carries at its other end 11 a pivot 12, upon which is mounted a brake shoe 13, which is adapted to be forced against one face of the corresponding brake disk 7. The cylinder 8 itself has a companion bifurcated lever 14 secured thereto and pivoted at 15, said lever carrying at its other end 16, a pivot 17, upon which is mounted the companion brake shoe 18, which coacts with the other face of the corresponding brake disk 7.

All three brake cylinders are carried by the cross member 19 which has the bearings for the pivots 10 and 15 attached thereto or integral therewith, and also has suitable stops 20 thereon, which cooperate with the levers 9 and 14 to maintain them in proper position when the brakes are not applied, in order normally to maintain clearance between the brake shoes and the brake disks.

The cross member 19 forms part of a yoke, which consists of said cross member and the two arms 21 attached to the ends of the same, and pivoted about the inner ends of the axle boxes 5, so that the yoke is thus pivotally movable about the axis of the axle 4. For ease of assembling and repair or replacement, it is preferred to provide a connecting strap at the end of each arm 21, so that the entire brake mechanism, exclusive of the disks, may be removed as a unit by removing the bolts 22 which hold the removable strap 23 to the rest of each arm 21. In order to provide a rigid mounting for the pivots 10 and 15, it is advantageous to provide transversely extending webs 24 and 25 connecting the bearings for the said pivots 10 and 15.

The transverse yoke member 19 is preferably bent at each end as shown, so as to clear the flanges of the wheels 6 near its ends, while nevertheless maintaining the greater portion of its length as close as possible to the peripheries of the brake disks 7. The object of this bending is to increase the space available between the transverse yoke member 19 and the adjacent transverse member 2 of the frame 1, so as to make the best possible use of the limited space which is available for the location of the brake cylinders.

With this same object in view it will be noted that the rearwardly extending arm 26, which connects the transverse yoke member 19 with the cross member 2 of the frame, is bent upwardly practically in the form of a quadrant, so as to clear the central brake cylinder 8 and its associated mechanism. This is in contrast to the present inventor's previously disclosed forms of brakes using only two disks, one at each end of the axle, wherein the central space behind the yoke is not obstructed, and the arm therefore extends straight back to a support carried by the cross member of the frame, instead of extending upward as here disclosed.

In the present construction, the resilient cushions 27, which retain the end 28 of arm 26 yieldingly in place, are located above the general level of the cross member 2, instead of below the same as in said previous constructions. This is accomplished by the fitting 29 which is secured to the cross member 2 in any suitable way, as by the bolts 30 and 31. In order to provide adequate strength and stability, it will be noted that in Fig. 1 the support 29 extends a considerable distance each way from the center. The cushions 27, which preferably are resilient, and may advantageously be made of rubber or the like, serve to prevent any undue strains from being set up by relative motion between the pedestal-supported yoke member and the cross bar 2 of the frame. Such motion, while relatively slight, nevertheless must be allowed for, and the provision of the resilient mounting constitutes a satisfactory solution of the difficulty, and prevents the destruction of the parts, which might otherwise occur.

In operation, when compressed air or other fluid underpressure is supplied to the brake cylinders 8, through the usual or conventional flexible piping, not illustrated, each piston will force the corresponding arm 9 to move away from its cylinder, while the cylinder 8 itself will move in the opposite direction. These movements take place about the respective pivots 10 and 15, so that the inner ends of the levers 9 and 14 will cause the brake shoes 13 and 18 to engage against opposite faces of the respective brake disks 7, so as to produce the desired braking effort. The shoes 13 and 18 may be guided toward and from one another by the guide mechanism diagrammatically illustrated at 31 as a rod or tube, and the levers are preferably connected by a restoring means, such as a spring or the like, as indicated for example in dotted lines in connection with the left-hand cylinder of Figure 1, which is sufficiently powerful to move the brake shoes from the brake disk, whenever no pressure-fluid is acting in the cylinder 8. Thus when the brake is not being applied, the levers 9 and 14 will rest against their respective stops 20 on the transverse yoke member 19 under the action of the restoring means.

While many details of the brake mechanism itself are disclosed herein, certain of them are not claimed here but form the subject matter of other applications for patent, for example applications Serial No. 198,398 filed March 28, 1938, and Serial No. 270,750, filed April 29, 1939.

It will be understood that while a specific embodiment of the invention is disclosed herein in detail, this is not intended in any way to restrict the scope of the invention to such definite embodiment. For a definition of the invention attention is therefore directed solely to the following claims.

I claim:

1. In combination, a truck frame having side frame members and a transverse frame member interconnecting said side frame members, a wheel and axle assembly supporting said frame and disposed in longitudinally spaced relation to said transverse frame member, a plurality of brake discs carried by said wheel and axle assembly to rotate with the wheels of said assembly, a brake supporting yoke disposed in the space between the side frame members, the transverse frame member and the axle of said assembly, said yoke being supported on the axle at spaced points and including a transversely extending portion arranged adjacent the peripheries of said discs and an arm extending from said transverse portion and secured to the transverse frame member, said yoke supporting pairs of brake shoes, one for cooperation with each of said discs, actuating means for each pair of shoes including a brake cylinder disposed between said transverse portion of the yoke and the transverse frame member, one of said cylinders being in the vertical plane of said arm, and the arm being offset to clear the cylinder.

2. The combination according to claim 1 in which the arm extends from the central portion of the transverse member and is offset upwardly to clear the cylinder.

3. The combination according to claim 1 in which the securement of the arm to the transverse frame member comprises a bracket rigidly secured to said member and having a pocket into which the end of said arm projects, and resilient means disposed between the ends of said arm and the walls of said pocket.

4. In combination, a truck frame having side frame members and a transverse frame member interconnecting said side frame members, a wheel and axle assembly supporting said frame and disposed in longitudinally spaced relation to said transverse frame member, a plurality of brake discs carried by said wheel and axle assembly to rotate with the wheels of said assembly, a brake-supporting yoke disposed in the space between the side frame members, the transverse frame member and the axle of said assembly, said yoke being supported on the axle at spaced points and including a transversely extending portion arranged adjacent the peripheries of said discs and an arm extending from said transverse portion and secured to the transverse frame member, said yoke supporting pairs of brake shoes, one for cooperation with each of said discs, actuating means for each pair of shoes including a brake cylinder movably mounted on said transverse portion of the yoke and disposed between said transverse portion of the yoke and the transverse frame member, one of said cylinders being in the vertical plane of said arm, and the arm being offset to clear the cylinder.

CAROLUS L. EKSERGIAN.